(12) United States Patent
Monno

(10) Patent No.: US 6,357,648 B1
(45) Date of Patent: Mar. 19, 2002

(54) METHOD AND APPARATUS FOR REMOVAL OF SOLDER

(75) Inventor: Bernd Monno, Berlin (DE)

(73) Assignee: Finetech GmbH & Co. KG., Berlin (DE)

( * ) Notice: Subject to any disclaimer, the term of this patent is extended or adjusted under 35 U.S.C. 154(b) by 0 days.

(21) Appl. No.: 09/489,634

(22) Filed: Jan. 24, 2000

(30) Foreign Application Priority Data

Jan. 25, 1999 (DE) .......................................... 199 03 957

(51) Int. Cl.$^7$ .............................. B23K 1/00; B23K 37/00
(52) U.S. Cl. ......................... 228/19; 228/20; 228/44.3; 228/101
(58) Field of Search ....................... 228/19, 20.1, 44.3, 228/47.1, 101, 119, 191

(56) References Cited

U.S. PATENT DOCUMENTS

| | | | | |
|---|---|---|---|---|
| 3,387,191 A | * | 6/1968 | Fishman et al. ............. 317/234 |
| 3,644,980 A | * | 2/1972 | Class, Jr. et al. ......... 29/203 B |
| 3,795,358 A | * | 3/1974 | Sarnacki et al. ............... 228/19 |
| 3,970,234 A | * | 7/1976 | Litt et al. ....................... 228/20 |
| 4,067,104 A | * | 1/1978 | Tracy ........................... 29/626 |
| 4,090,656 A | * | 5/1978 | Sato et al. .............. 228/180 R |
| 4,193,160 A | * | 3/1980 | Vandermark ................... 15/341 |
| 4,416,408 A | * | 11/1983 | Spirig .......................... 228/19 |
| 4,436,242 A | * | 3/1984 | Shisler et al. ................ 228/264 |
| 4,465,223 A | * | 8/1984 | Cammarano et al. ......... 228/198 |
| 4,541,358 A | * | 9/1985 | Spigarelli et al. ............. 118/58 |
| RE32,086 E | * | 2/1986 | Spirig .......................... 228/19 |
| 4,569,473 A | * | 2/1986 | Guiliano .................... 228/264 |
| 4,574,994 A | * | 3/1986 | Rauchwerger ................ 228/20 |
| 4,602,733 A | * | 7/1986 | Slack et al. .................. 228/242 |
| 4,696,096 A | * | 9/1987 | Green et al. ................... 29/829 |
| 4,746,050 A | * | 5/1988 | Brown ......................... 228/57 |
| 4,767,047 A | * | 8/1988 | Todd et al. ................... 228/6.2 |
| 4,769,083 A | * | 9/1988 | Tiritilli ........................... 134/6 |
| 4,771,932 A | * | 9/1988 | Kim ........................ 228/180.1 |
| 4,813,589 A | * | 3/1989 | Palmer et al. ............... 228/119 |
| 4,832,250 A | * | 5/1989 | Spigarelli et al. ........... 228/102 |
| 4,877,175 A | * | 10/1989 | Jones et al. ................. 228/102 |
| 4,896,019 A | * | 1/1990 | Hyun ......................... 219/228 |
| 4,899,920 A | * | 2/1990 | Abbagnaro et al. ........... 228/11 |
| 5,072,873 A | * | 12/1991 | Liu et al. .................... 228/264 |
| 5,176,307 A | * | 1/1993 | Hagerty et al. ............... 228/37 |
| 5,227,604 A | * | 7/1993 | Freedman ................ 219/121.63 |
| 5,280,668 A | * | 1/1994 | Fortune .................... 15/415.1 |
| 5,288,332 A | * | 2/1994 | Pustilnik et al. ............. 134/27 |
| 5,390,845 A | * | 2/1995 | McDonald .................. 228/217 |
| 5,402,563 A | * | 4/1995 | Satoh et al. .................. 29/829 |
| 5,458,281 A | * | 10/1995 | Downing et al. ........... 228/264 |
| 5,560,531 A | * | 10/1996 | Ruszowski ................... 228/19 |
| 5,579,979 A | * | 12/1996 | Kurpiela ..................... 228/6.2 |
| 5,620,132 A | * | 4/1997 | Downing et al. ........... 228/264 |
| 5,785,237 A | * | 7/1998 | Lasto et al. ............. 228/180.22 |
| 5,909,838 A | * | 6/1999 | Jimarez et al. ............. 228/125 |
| 5,934,545 A | * | 8/1999 | Gordon ..................... 228/191 |
| 6,053,393 A | * | 4/2000 | Burke et al. ................ 228/119 |
| 6,131,791 A | * | 10/2000 | Masaki ....................... 228/4.1 |
| 6,131,794 A | * | 10/2000 | Burke et al. .............. 228/20.1 |
| 6,227,434 B1 | * | 5/2001 | Bassi et al. ................. 228/119 |

* cited by examiner

*Primary Examiner*—Tom Dunn
*Assistant Examiner*—Zidia Pittman

(57) ABSTRACT

The invention relates to a method and an apparatus (22) for removing solder from a circuit board (5) from which electrical or electronic components have been removed at soldering points. The invention is addressed to the problem of offering a method and an apparatus by which the residual solder can be entirely removed from the circuit board (5) and by which even a large area on the circuit board (5) can be freed quickly and easily of the residual solder. This problem is solved by a method in which the solder after melting is pushed away from the soldering points by at least one pushing means (13a) or displaced therefrom by a plunger element, and is then removed from the circuit board (5). The apparatus (22) according to the invention makes available the means needed for the purpose.

29 Claims, 3 Drawing Sheets

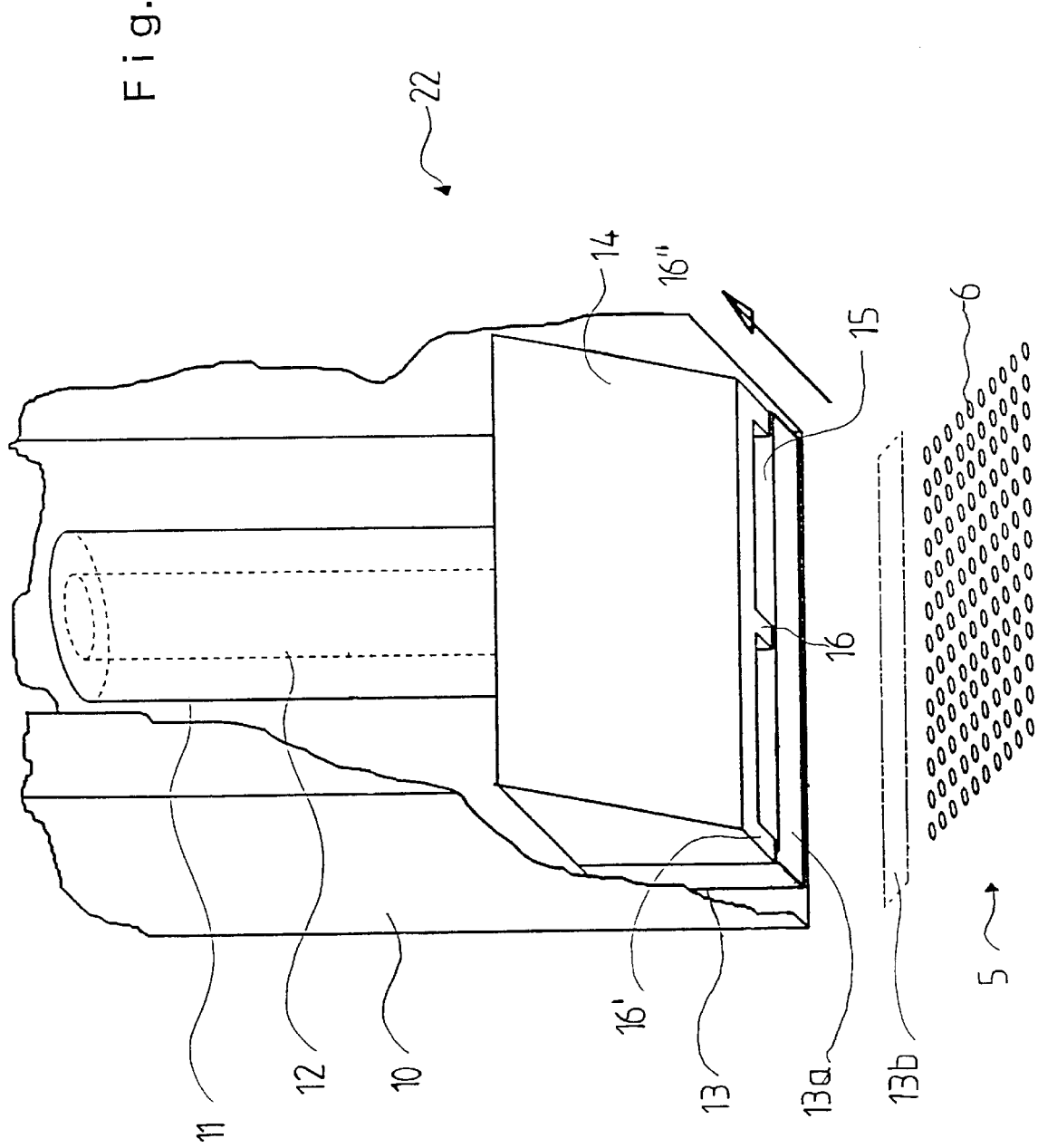

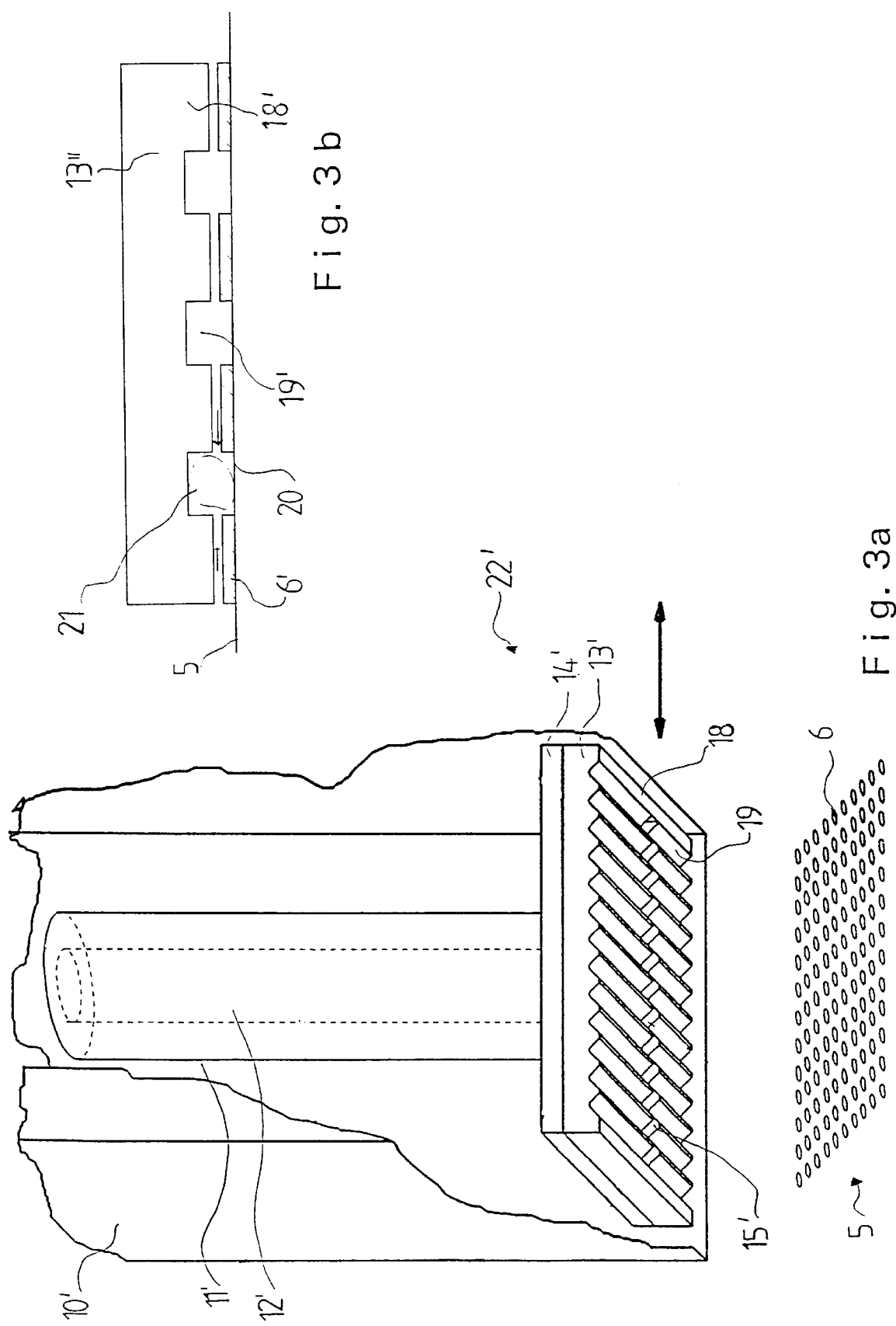

METHOD AND APPARATUS FOR REMOVAL OF SOLDER

The invention relates to a method and an apparatus for the removal of solder.

Electronic components which are soldered at junctions on a circuit board today form the basis of any kind of electronic apparatus. On a circuit board of this kind, circuits are especially used as electronic components which are known by the names, "ball grid array," "flip chip" and "chip scale package."

In the event of malfunction the electronic components must be replaced. For this purpose they are desoldered from the circuit board. This signifies that the solder at the junctions is melted and the electronic components are removed from the board while the solder is still fluid.

After the electronic components are removed, the residual solder remaining on the circuit board must often be removed. A reason for this is, for example, the content of components that are dissolved in the solder, making impossible to the reuse the solder.

A simple method for the removal of residual solder is to remove it by means of a piece of fine stranded tinned copper wire. The residual solder is first melted and then is absorbed by the stranded wire by virtue of a capillary effect of the stranded wire. The stranded wire is pressed lightly against the circuit board for this purpose.

To enable the residual solder to be absorbed by the stranded wire the use of a flux is necessary. After the components are soldered back in, the flux may interfere with the adhesion of an "underfiller." This term refers to a plastic which is applied in liquid form between the component and the circuit board, where it is cured. An underfiller relieves mechanical stress on the junctions. Furthermore, the stranded wire method of the removal of residual solder from very large surfaces is tedious and difficult. Also, there is the danger that, when the stranded wire is lifted from the circuit board the solder residue may solidify again, so that as the stranded wire is further raised, conductors printed on the circuit board may become damaged.

US-A-5,284,286 discloses a porous copper block with which the residual solder is removed from a circuit board, also by means of capillary action. The copper block has projections which absorb the residual solder. Small amounts of solder which adhere very strongly to the junctions of the circuit board are not, however, absorbed by the known copper block. Furthermore the use of flux is necessary in this known process.

Furthermore known is a vacuum desoldering bulb in the tip of which a hole is provided such that the solder fused to the tip can be sucked away through the hole. It is a disadvantage in this case that this vacuum desoldering bulb has to be guided by hand over the circuit board. Thus damage is often done to the fine conductor strips. Furthermore, small amounts of solder cannot be removed with the known vacuum desoldering bulb, since the suction power of the vacuum bulb does not suffice to remove these small amounts of solder adhering to the circuit board.

The present invention is therefore addressed to the problem of offering a method and an apparatus by which the solder—especially residual solder—can be completely removed from a circuit board, by which damage to the conductor strips is avoided, and by which even a large area on the circuit board can be quickly and easily freed of the solder.

This problem is solved according to the invention by a method with the features of claim 1 as well as an apparatus with the features of claim 9.

The method of the invention is based on the knowledge that, after melting, the residual solder is shifted by a pushing means from soldering points of a circuit board, first into other areas of the circuit board which have far less tendency to adhere to the residual solder. From these areas the residual solder is very easy to remove, so that even very small amounts of solder which due to their surface tension are not driven by a gas stream are removed from the circuit board.

Alternatively, a plunger element is used which is placed on the junctions with the solder to be removed and displaces the solder from the junctions.

After the aforesaid shifting or displacement of the residual solder, the residual solder is preferably removed from the circuit board by aspiration. Advantageous in this case is the use of a vacuum aspiration device.

In an advantageous embodiment of the method of the invention, the molten residual solder is shifted to areas of the circuit board which are not wettable by the solder due to their coating. The residual solder cannot solidify in these areas, so that it is very easily sucked away from them.

The at least one pushing means is preferably pressed against the circuit board with an adjustable force. In this embodiment of the invention it is advantageous that the pushing means is always pressed against the circuit board with such a sufficient force that even fused solder adhering very strongly to the junctions and to the circuit board is moved by the pushing means.

In a preferred embodiment of the method of the invention the fusion of the residual solder is performed by a hot gas. Suitable especially for this purpose is an inert gas, nitrogen for example. The use of an inert gas has the advantage that it does not react chemically either with the surface of the circuit board or with the residual solder. The formation of new substances which might impede the removal of the solder from the circuit board is thus excluded.

In another embodiment, before the gas is fed to the circuit board, formic acid is added to it in order to reduce any oxide coatings present on the melted solder. In this manner the residual solder can then be better removed from the circuit board.

In another embodiment of the method of the invention, the residual solder is aspirated at a faster rate than the rate of delivery of the hot gas. In this manner a gas flow is formed which primarily heats the amount of the residual solder that is to be melted, without heating areas of the circuit board adjoining the area in which the component was disposed on the circuit board. In this manner it is also assured that the molten and already displaced solder will not unintentionally be distributed back onto the circuit board, but will be aspirated immediately after it shifts. It has been found especially that small amounts of solder are driven by the suction flow and aspirated just when they are moved by the vacuum flow.

An apparatus according to the invention, with the features of claim 9, is especially suited for the practice of the method of the invention described above.

The apparatus according to the invention is based, like the method of the invention, on the knowledge that the residual solder can be removed very easily from a circuit board if after it is melted it is shifted by means of at least one pushing means from junctions on the circuit board, at first into other areas of the circuit board which offer far less adhesion for the residual solder. From these areas the residual solder, especially small amounts thereof, are very easy to remove.

Alternatively, a plunger element is provided to displace the molten solder from the junctions.

Preferred embodiments of the apparatus of the invention are described below. As regards their advantages, see the statements set forth above insofar as they are not explicitly mentioned hereinafter.

The apparatus according to the invention has preferably a gas feeder by which hot gas is delivered to the circuit board to melt the residual solder. The gas feeder is advantageously made with such thin walls that it has a very low heat capacity. Thus very little heat passes from the hot gas to the gas feeder, so that the hot gas strikes the circuit board at virtually the same temperature at which it is delivered into the gas feeder. A reliable and complete melting of the residual solder is thus assured.

In a special embodiment of the apparatus of the invention the outer circumference of the gas feeder is configured such that it covers the entire circuit board area from which the solder is to be removed. In this manner all of the solder to be removed is melted in a single step.

The pushing means is preferably disposed within the outer circumference of the gas feeder. This assures that even while the residual solder is being shifted from the junctions of the circuit board the residual solder will not solidify.

In an additional embodiment of the apparatus of the invention the gas feeder completely surrounds the pushing means, so that when the gas feeder is placed on the circuit board the contact area between the gas feeder and the circuit board is sealed off. In that case the gas feeder is disposed on the pushing means such that it does not change its position on the circuit board when the pushing means moves. The arrangement of the gas feeder on the pushing means is accomplished preferably by means of a resilient connection. The sealed configuration and the described arrangement of the gas feeder on the pushing means has the advantage that only a certain area of the circuit board is heated. Junctions in other areas of the circuit board, at which additional electronic components are soldered, are not heated, so that the contacts at these junctions are not accidentally broken.

The pushing means is preferably made of a heat-resistant and resilient material. Especially suitable for this is silicone rubber. A pushing means of this material is not deformed by the hot gas, so that a sufficient pushing effect is always made available. The resiliency also assures that the pushing means is always pressed against the circuit board only with such light pressure that the circuit board, especially its conductor strips, will not be damaged.

In a preferred embodiment the apparatus of the invention has a suction device, especially a vacuum aspirating device, by which the molten solder is sucked up from the circuit board.

The aspirating device is preferably disposed at least partially on the pushing means. A central arrangement of the suction device on the pushing means is advantageous. At the same time provision is made such that the pushing means forms at least partially the outer wall of a suction passage.

The pushing means is preferably arranged between a placing means and a suction device such that the part of the pushing means pushing the molten solder is pressed forward by an adjustable force between the placing means and the suction device.

In a further embodiment of the apparatus of the invention the suction device has at least one opening of the suction passage whose outside dimension corresponds preferably at least partially to the outside dimension of the pushing means. This assures that all of the residual solder that is pushed by the pushing means is sucked up from the circuit board.

The pushing means and/or the opening of the suction device are preferably of rectangular configuration. Alternatively, or in addition thereto, the pushing means has at least one rectangular or triangular groove. Furthermore, the pushing means has as pushing surface a substantially rectangular element whose length corresponds to the length of a row of soldering points on the circuit board.

A plurality of grooves of the pushing means are preferably arranged at a distance from one another that corresponds to the spacing of the soldering points of the circuit board. It is advantageous in this case that one groove can be disposed over one soldering point or over soldering points arranged in a row. After the residual solder is melted it is pushed by means of the lateral surfaces of the grooves from the junctions onto the circuit board. With this arrangement it is possible by means of a slight movement of the pushing means to remove from the circuit board all of the residual solder situated in the junctions or the adjacent areas of the circuit board.

In a further embodiment of the invention the plunger element has rows of grooves and ridges, the ridges corresponding to rows of junctions on the circuit board, and when the plunger element is placed on the circuit board they are placed on the row of soldering points in order to displace the solder.

In an additional preferred embodiment of the apparatus according to the invention, means are provided which hold the apparatus at a predetermined distance above the surface of the circuit board and/or press the pushing means against the circuit board with an adjustable force.

These means assure that only those parts of the apparatus touch the circuit board whose contact therewith is really necessary for the removal of the residual solder, especially those of the pushing means. This contact takes place also with only a specific force in order not to damage the circuit board. Holders and placing means already known are suitable for this purpose.

Furthermore, the apparatus according to the invention preferably has means whereby the apparatus can be displaced relative to the position of the circuit board and parallel to its surface. Suitable for this purpose are especially micrometer screws or stepper motors. The position of the apparatus with respect to the surface of the circuit board can thus be precisely established.

Embodiments represented in the drawing are intended to explain ideas on which the invention is based.

DESCRIPTION OF THE FIGURES

FIG. 2 a partially cut-away perspective elevation of the apparatus of the invention according to FIG. 1;

FIG. 3a a partially cut-away perspective elevation of an alternative embodiment of the apparatus of the invention, and FIG. 3b a partially cut-away perspective elevation of a slightly modified embodiment of the apparatus of the invention, with a plunger element.

FIG. 1 shows in a schematically perspective elevation a known apparatus for the installation and removal of electronic components on a circuit board 5. The apparatus 1 has a base plate 2 on which an adjustable table formed of two rails 4 and 4' is disposed, whose position relative to the base plate 2 is precisely adjusted by means of micrometer screws 3 and/or 3'. Between the rails 4 and 4' the circuit board 5 is held by a clamping device not shown, such that the position of the circuit board 5 is adjusted by moving the table.

Figure 1:
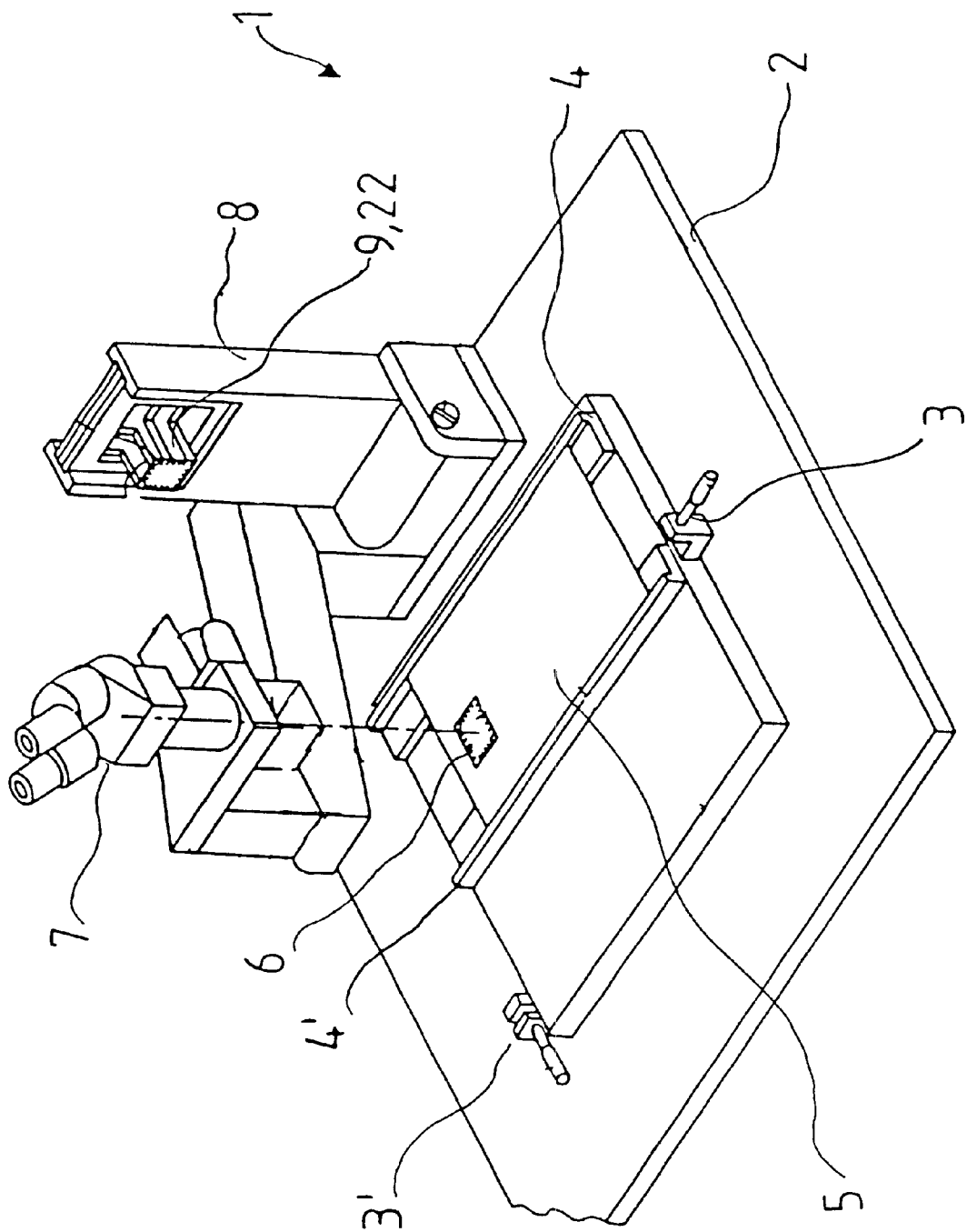
FIG. 1 is a schematic perspective view of a known apparatus for the installation and removal of electronic components on a circuit board, with an apparatus according to the invention for the practice of the method of the invention.

The position of the circuit board 5 is precisely determined by means of an observation apparatus 7. To install or remove the electronic components, the circuit board 5 is positioned by adjusting the micrometer screws 3 and 3' and by observing the adjustment by means of the observation apparatus 7, such that the soldering points 6 to which the electronic component is to be soldered or desoldered assume accurately the position which is assumed by a head 9 of a hinged soldering device 8 on the circuit board 5 when the soldering device 8 is turned toward the circuit board 5. The rest of the process for soldering or desoldering the electronic components by means of this soldering apparatus 8 is not further explained herein.

An apparatus 22 according to the invention for the removal of residual solder still remaining on the circuit board after the removal of the electronic components can be placed on the head 9 of the soldering device 8. Alternatively, it is also possible to integrate the apparatus 22 of the invention into the head 9 of the soldering device 8.

FIG. 2 shows the apparatus 22 according to the invention placed on the head 9. First the construction of the apparatus of the invention will be described, and then the method of the invention will be explained with reference thereto.

The apparatus 22 has a thin external wall 10 in which a placing means 13 is mounted on a holder 11. Both the wall 10 and the holder 11 are fastened to one end of the soldering device 8 in a manner not represented. The area between the wall 10 and the placing means 13 serves for feeding a hot gas to the circuit board 5 in order to melt the residual solder on the circuit board, especially at the soldering points 6 of the circuit board 5 which here are disposed in the form of an array.

A pushing means 13a is formed from a heat-resistant silicone rubber and has a rectangular slide face. It is disposed between the placing means 13 and a body 14 of a vacuum device by which the residual solder is aspirated from the circuit board. In addition to the body 14, the vacuum device has additional units, not disposed in the apparatus 22, which in this embodiment are disposed in the immediate vicinity of the apparatus 1 and are not shown here, especially a pump and a receiver for the aspirated residual solder.

The body 14 of the vacuum device has two openings 15 whose outside dimensions are determined by bridges 16, 16' and 16' on the body 14. The bridges 16, 16' and 16' abut directly against the pushing means 13a, so that the openings 15 form two channels through which the residual solder is sucked. The mouths of the two channels which are situated on the opposite side of the pushing means 13a and of body 14, facing the circuit board, and are not shown here, lead into a suction tube 12 which is disposed centrally within the holder 11.

The pushing means 13a is fastened with an adjustable force between the body 14 and the placing means 13. The greater the force that is selected the larger is the portion of the pushing means 13a that is pressed forward between the body 4 and the placing means 13.

In this embodiment of the apparatus according to the invention it is advantageous that the pushing means 13a is disposed so that it projects slightly below the external dimension of the body 14. At their sides facing the circuit board the pushing means 13a and the body 14 are therefore offset step-wise from one another.

This stepped arrangement assures that the vertically movable pushing means 13a is placed by means of a driver, not shown, of the holder 11, onto the circuit board 5 such that neither the body 14 of the vacuum device nor the wall 10 touches the circuit board 5. Accordingly, only the resilient and soft pushing means 13a contacts the circuit board 5, so that no damage can be done to the circuit board 5 by the body 14 or the wall 10.

In an alternative embodiment, the wall 10 is provided on its boundary facing the surface of the circuit board with a gasket running entirely around it. In this alternative embodiment both the pushing means 13a and the wall 10 are placed onto the surface of the circuit board 5. On account of the gasket a certain area of the circuit board 5 is sealed off such that only the residual solder in this area is melted. It is important in this embodiment that the wall 10 is arranged such in the apparatus 22 that the position of the wall 10 does not change when the pushing means moves.

The method of the invention will now be described with reference to the apparatus according to the invention which has been described. It is assumed that an electronic component soldered on the circuit board 5 is defective and must be replaced.

For this purpose the circuit board 5 is clamped in the rails 4 and 4' of the known apparatus 1 and positioned by means of the micrometer screws as well as the observation device 7, such that when the soldering apparatus 8 is lowered onto the circuit board 5 the electronic component is desoldered and removed from the circuit board 5.

To remove the residual solder, the apparatus 22 of the invention, described above, is placed onto the head 9 of the soldering apparatus and fastened there. This is accomplished by fastening means not shown.

The soldering apparatus 8 equipped the apparatus of the invention is then swung down toward the circuit board such that the apparatus 22 is at a slight distance of a few tenths of a millimeter parallel to the surface of the circuit board 5. At the same time the pushing means 13a contacts the circuit board 5; the pushing means 13a is accordingly placed onto the circuit board 5.

When thus placed the pushing means 13a contacts the outlined area 13b of the surface of the circuit board 5. However, neither the wall 10 nor the body 14 of the vacuum device contacts the surface of the circuit board 5 on account of the step-like offset described above. Due to the step-like offset the body 14 is instead held at a slight distance of a few tenths of a millimeter above the surface of the circuit board 5. In this embodiment the distance amounts to 0.4 mm.

After the placement of the pushing means 13a onto the surface of the circuit board 5, hot nitrogen is blown onto the surface of the circuit board within the wall 10, especially onto the soldering points 6, in order to melt the residual solder. It has been found that the fusion is performed especially well at a nitrogen temperature of 340° C. and a delivery rate of 30 liters of nitrogen per minute. Alternatively, any other temperature and delivery rate can be used which is capable of melting the residual solder.

Alternatively to nitrogen, any other gas can be used for melting the residual solder, especially any inert gas. The use of an inert gas has the advantage that it does not react chemically with the surface of the circuit board nor with the residual solder, so that the formation of any new substance that might interfere with the removal of the solder from the circuit board is prevented.

In the embodiment of the invention here described, a very small amount of formic acid can be added to the hot nitrogen before it is fed to the circuit board. The formic acid reduces oxide coatings present on the solid residual solder, so that the surface tension of the molten tin can act freely.

A few seconds after the hot nitrogen is applied the residual solder is melted. The position of the circuit board 5 is now shifted by means of the micrometer screws 3 or 3' of the known apparatus 1 so that the apparatus 22 performs a movement relative to the circuit board 5 in the direction of the arrow. The contact between the pushing means 13a and the surface of the circuit board 5 is not thereby broken. The melted residual solder from the solder points 6 is pushed by the pushing means 13a into areas of the circuit board which are not easily if at all wettable by the residual solder. The residual solder is sucked away from these areas through the openings 15 in the vacuum apparatus.

As an alternative (not represented) the pushing means 13a is displaced with respect to the circuit board. Only a relative movement is essential.

It is especially advantageous that particularly even small amounts of residual solder are easily sucked up, since they adhere but slightly to the unwettable areas of the circuit board 5.

In the embodiment described, the aspiration rate is about 50 liters per minute and is accordingly greater than the delivery rate of the hot gas of 30 liters per minute. In this manner molten solder is prevented from spreading on the circuit board; instead, the residual solder is sucked up through the openings 15 immediately after it is pushed.

The force with which the pushing means 13a is pressed against the surface of the circuit board is adjustable. It depends on the one hand on the configuration of the circuit board 5, especially its thickness, and on the other hand on the adhesion of the residual solder on the surface of the circuit board 5. It is made sufficiently great so that the circuit board 5 is not damaged and solder adhering very strongly to the soldering points and to the circuit board is scraped away by the pushing element 13a.

An alternative embodiment of the apparatus of the invention with the advantages explained is shown in FIG. 3a. The apparatus 22' of the invention can also be placed on the head 9 of the soldering apparatus 8 and, as in the embodiment in FIG. 2, it has a thin outer wall 10' in which a holder 11' and a suction tube 12' of a vacuum aspirating system are disposed.

On the end of the aspirating tube 12' there is a rectangular body 14' which has a slotted opening 15' which continues in a pushing means 13' formed of heat-resistant silicone rubber and disposed on the body 14'. The continuation is such that the opening 15' is centrally disposed on the pushing means 13'.

The pushing means 13' is entirely disposed on the surface of body 14' that faces the surface of the circuit board 5 and has a plurality of parallel triangular grooves 19 which are separated from one another by ridges 18. The grooves 19 and ridges 18 are arranged parallel to the rows of the soldering points 6 of the circuit board 5, so that when the apparatus 22 is placed on the surface of the circuit board 5, a row of soldering points 6 of the array lies in a groove 19 of the pushing means 13'.

The opening 15' continuing into the pushing means 13' has an external size which corresponds substantially to the external size of a lateral length of the pushing means 13'. Each groove 19 is connected with the opening 15'.

As in the embodiment according to FIG. 2, the apparatus 22' on the soldering apparatus 8, in the embodiment in FIG. 3, is turned down toward the circuit board 5. While the wall 10' is held at a height of a few tenths of a millimeter—for example 0.5 mm—above the surface of the circuit board 5, the pushing means 13' is placed down onto the surface of the circuit board 5 such that each row of soldering points 6 of the array lies in a groove 19.

To melt the residual solder, hot gas is blown toward the circuit board S through the areas between the pushing means 13' and the wall 10'. Due to the aspirating action of the vacuum aspirating system the hot gas is then drawn through the lateral openings of the grooves 19 into the grooves 19, so that the solder situated within the grooves 19 is melted. Then the position of the circuit board 5 is shifted by means of the micrometer screws 3 or 3' of the known apparatus 1 such that a movement of the apparatus 22' relative to the circuit board occurs in the direction of the arrow. The pushing means 13' is thereby pushed across the surface of the circuit board 5. Thus the solder is carried along by the ridges 18 and pushed into areas of the circuit board in which the solder adheres but slightly to the surface of the circuit board. From there it is sucked through the grooves 18 and openings 15'.

Another embodiment of the invention is shown in FIG. 3b. The apparatus 22' according to the invention has a plunger element 13' having rectangular grooves 19' which are separated from one another by ridges 18'. The circuit board 5 represented in FIG. 3b has areas 20 between the soldering points 6' which are not wettable by the residual solder. This is achieved by means of known coatings on the circuit board. By means of the plunger element 13' the residual solder, melted by the hot gas, is displaced, by lowering the soldering apparatus 8, from the soldering points 6' into the areas 20 (in the direction of the arrow), where it is sucked up. When the plunger element 13' is lowered by the soldering apparatus 8, it displaces the residual solder melted by the hot gas from the soldering points 6' into the areas 20 (in the direction of the arrow) where it is sucked up.

The invention is not limited to the above embodiments. It is essential to the invention only that the residual solder, after being melted, is shifted by at least one pushing means from the soldering points or displaced therefrom by at least one plunger element and then removed from there.

What is claimed is:

1. Method for removing solder from a circuit board from which electrical or electronic components fastened at soldering points on the circuit board have been removed, the solder being melted before removal, wherein the solder, after melting, is pushed from the soldering points or displaced from them by at least one pushing means or plunger and is then removed from the circuit board by aspirating the solder by vacuum aspirating means.

2. Method according to claim 1, wherein the melted solder is displaced into areas of the circuit board which are not wettable by the solder, and is aspirated from said areas of the circuit board which are not wettable by the solder.

3. Method according to claim 1 wherein the pushing means for pushing the solder is pressed with an adjustable force against the circuit board.

4. Method according to claim 2, wherein the melting of the solder is performed by means of a hot gas.

5. Method according to claim 4 wherein an inert gas, especially nitrogen, is used as the gas.

6. Method according to claim 5 wherein before feeding gas to the circuit board, an activator, especially formic acid, is added to the gas in order to dissolve oxide coatings present on the solder.

7. Method according to claim 4, wherein the aspiration volume is greater than the volume of the delivered hot gas.

8. Apparatus for removing solder from a circuit board from which electrical or electronic components fastened at soldering points of the circuit board have been removed, with a means for melting and a means for removing the solder from the circuit board, wherein said means for removing the solder from the circuit board comprises at least one member selected from the group consisting of a pushing means for pushing the melted solder from the soldering points or a plunger element for displacing the melted solder from the soldering points; and an aspirating apparatus for aspirating melted solder from a circuit board.

9. Apparatus according to claim 8, further comprising a gas feeder having an outer circumference and outer periphery for feeding a hot gas to the circuit board to melt the solder on the circuit board.

10. Apparatus according to claim 9, wherein said gas feeder is thin-walled.

11. Apparatus according to claim 9, wherein the outer circumference of the gas feeder is configured such that it covers the entire area of the circuit board in which the solder is to be removed.

12. Apparatus according to claim 9 wherein the pushing means is disposed within the outer periphery of the gas feeder.

13. Apparatus according to claim 9, wherein the gas feeder completely surrounds the pushing means, seals off the area of contact with the circuit board on its entire periphery when placed on the circuit board, and is disposed on the pushing means such that, upon a movement of the pushing means, it does not change its position on the circuit board.

14. Apparatus according to claim 9, wherein the gas feeder is connected resiliently with the pushing means.

15. Apparatus according to claim 8, wherein the pushing element is formed of a heat-resistant and resilient material, especially silicone rubber.

16. Apparatus according to claim 8, wherein the aspirating apparatus is disposed at least partially on the pushing means.

17. Apparatus according to claim 8, wherein the aspirating apparatus is disposed centrally on the pushing means.

18. Apparatus according to claim 8, wherein a placing means is provided, by which the pushing means is fastened against the aspirating apparatus with an adjustable force.

19. Apparatus according to claim 8, wherein the vacuum apparatus has at least one opening.

20. Apparatus according to claim 19, wherein the outer size of the opening corresponds at least partially to the outer size of the pushing means.

21. Apparatus according to claim 20, wherein at least one of the pushing means or the opening of the vacuum apparatus are of rectangular shape.

22. Apparatus according to claim 8, wherein the pushing means has as pushing face a substantially rectangular element whose length corresponds to the length of a row of soldering points of the circuit board.

23. Apparatus according to claim 8, wherein the pushing means has at least one groove.

24. Apparatus according to claim 23, wherein a plurality of grooves of the pushing element are arranged at a distance apart which corresponds to the spacing of rows of soldering points of the circuit board.

25. Apparatus according to claim 8, wherein the plunger element has rows of grooves and ridges, the ridges corresponding with rows of soldering points of the circuit board and are placed on the rows of soldering points when the plunger element is placed upon the circuit board.

26. Apparatus according to claim 8, further comprising a holding apparatus connected to the apparatus for removing solder for holding the apparatus at a predetermined distance above at least one of the surface of the circuit board.

27. Apparatus according to claim 8, further comprising a displacing apparatus connected to the apparatus for removing solder for displacing the apparatus relative to the position of the circuit board and parallel to the surface of the circuit board.

28. Apparatus according to claim 23, wherein the groove is rectangular or triangular.

29. The apparatus of claim 8, wherein said aspirating apparatus is a vacuum aspirating apparatus.

* * * * *